United States Patent
Dong et al.

(10) Patent No.: US 11,271,879 B2
(45) Date of Patent: *Mar. 8, 2022

(54) INFORMATION TRANSMISSION CONTROL METHOD, APPARATUS, AND SYSTEM

(71) Applicant: TENCENT TECHNOLOGY (SHENZHEN) COMPANY LIMITED, Shenzhen (CN)

(72) Inventors: Jian Dong, Shenzhen (CN); Xuewei Fang, Shenzhen (CN); Lei Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/088,533

(22) Filed: Nov. 3, 2020

(65) Prior Publication Data

US 2021/0051119 A1 Feb. 18, 2021

Related U.S. Application Data

(63) Continuation of application No. 15/331,194, filed on Oct. 21, 2016, now Pat. No. 10,880,239, which is a (Continued)

(30) Foreign Application Priority Data

Apr. 21, 2014 (CN) .......................... 201410160991.X

(51) Int. Cl.
*H04L 12/58* (2006.01)
*H04L 29/06* (2006.01)
(Continued)

(52) U.S. Cl.
CPC .......... *H04L 51/04* (2013.01); *H04L 63/0876* (2013.01); *H04L 67/306* (2013.01)

(58) Field of Classification Search
CPC .... H04L 51/04; H04L 63/0876; H04L 67/306
See application file for complete search history.

(56) References Cited

U.S. PATENT DOCUMENTS 6,718,388 B1 4/2004 Yarborough et al.
7,914,381 B2 3/2011 Blythe et al.
(Continued)

FOREIGN PATENT DOCUMENTS

CN 1364374 A 8/2002
CN 101662378 A 3/2010
(Continued)

OTHER PUBLICATIONS

SIPO Search Report for counterpart CN Application No. 201410160991X, dated Mar. 21, 2019 (1 pg.).
(Continued)

*Primary Examiner* — Chirag R Patel
*Assistant Examiner* — Rachel J Hackenberg
(74) *Attorney, Agent, or Firm* — Anova Law Group, PLLC

(57) ABSTRACT

Embodiments of the present invention disclose an information transmission control method, apparatus, and system. Implementation of the method includes: receiving, by a first communications server, information data from a first terminal served by the first communications server; determining, by the first communications server, a target identifier of the information data; and sending the information data to a second communications server if the target identifier belongs to identifier information of the second communications server, so that the second communications server sends the information data to a second terminal corresponding to
(Continued)

the target identifier. The first communications server and the second communications server correspond to two communications platforms; and the first communications server determines a target of the information data from a local platform, and then performs cross-platform forwarding, thereby implementing cross-platform instant messaging.

17 Claims, 5 Drawing Sheets

Related U.S. Application Data continuation of application No. PCT/CN2015/077054, filed on Apr. 21, 2015.

(51) Int. Cl.
*H04L 29/08* (2006.01)
*H04L 51/04* (2022.01)
*H04L 67/306* (2022.01)

(56) References Cited

U.S. PATENT DOCUMENTS

| | | | |
|---|---|---|---|
| 8,043,159 B2 | 10/2011 | Bae et al. | |
| 9,253,623 B2 | 2/2016 | Wu et al. | |
| 2007/0191100 A1 | 8/2007 | Counts | |
| 2008/0207233 A1 | 8/2008 | Waytena et al. | |
| 2009/0181767 A1* | 7/2009 | Feng | A63F 13/795 463/29 |
| 2009/0227375 A1* | 9/2009 | Weisman | A63F 13/332 463/41 |
| 2010/0029379 A1 | 2/2010 | Lo | |
| 2013/0103798 A1* | 4/2013 | El Chami | H04L 65/4015 709/217 |
| 2015/0111643 A1 | 4/2015 | Olofsson et al. | |

FOREIGN PATENT DOCUMENTS

| | | |
|---|---|---|
| CN | 102281526 A | 12/2011 |
| CN | 103095549 A | 5/2013 |
| CN | 103634392 A | 3/2014 |
| CN | 103916311 A | 7/2014 |
| CN | 106027597 A | 10/2016 |

OTHER PUBLICATIONS

International Search Report and Written Opinion for counterpart PCT Application No. PCT/CN2015/077054, dated Jul. 22, 2015 (7 pgs.).

* cited by examiner

INFORMATION TRANSMISSION CONTROL METHOD, APPARATUS, AND SYSTEM

RELATED APPLICATIONS

This application is a continuation application of U.S. patent application Ser. No. 15/331,194, filed on Oct. 21, 2016, which in turn is a continuation application of PCT Patent Application No. PCT/CN2015/077054, filed on Apr. 21, 2015, which in turn claims priority to Chinese Patent Application No. 201410160991.X, entitled "INFORMATION TRANSMISSION CONTROL METHOD, APPARATUS, AND SYSTEM" and filed with the Chinese Patent Office on Apr. 21, 2014, all of which are incorporated by reference in their entirety.

FIELD OF THE TECHNOLOGY

The present disclosure relates to the field of communication technologies, and in particular, to an information transmission control method, apparatus, and system.

BACKGROUND OF THE DISCLOSURE

Instant messaging (IM) is an instant message communication service based on the Internet.

Instant messaging can enhance information communication between networks, and mostly importantly, can directly connect website information and a chat user. By sending website information to a chat user group in time, attention of the chat user group can be rapidly attracted to a website, thereby increasing a visit rate and a revisit rate of the website.

Instant messaging uses the Internet, and effectively saves time and an economic cost of two communication parties through information communication and interaction by means of a text, voice, video, and file. Instant messaging systems not only become communication tools for people, but also become platforms used by people to communicate for electronic commerce, work, study, and the like.

Based on different applications and different clients, there are different instant messaging implementation solutions and different groups. For example, in a client game, players can implement instant messaging by entering a game client and using a communication function of the game client, where a game society belongs to a group, and members of the society are group members. For another example, in instant messaging clients such as QQ, there are also groups.

Currently, instant messaging is all implemented within a platform, and users cannot implement instant messaging across platforms.

SUMMARY

Embodiments of the present invention provide an information transmission control method, apparatus, and system to implement cross-platform instant messaging.

According to an aspect, an embodiment of the present invention provides an information transmission control method, including:

receiving, by a first communications server, information data from a first terminal served by the first communications server;

determining, by the first communications server, a target identifier of the information data; and sending the information data to a second communications server if the target identifier belongs to identifier information of the second communications server, so that the second communications server sends the information data to a second terminal corresponding to the target identifier.

According to another aspect, an embodiment of the present invention provides an information transmission control method, including:

acquiring, by a first terminal, identifier information that belongs to a second communications server, and displaying the acquired identifier information, the first terminal being a terminal served by a first communications server;

receiving, by the first terminal, information data, a target identifier corresponding to the information data being the identifier information of the second communications server; and sending, by the first terminal, the information data to the first communications server, so that the first communications server forwards the information data to the second communications server.

According to another aspect, an embodiment of the present invention provides a communications server, being used as a first communications server, and including:

an information receiving unit, configured to receive information data from a first terminal served by the first communications server;

an identifier determining unit, configured to determine a target identifier of the information data; and an information sending unit, configured to send the information data to a second communications server if the target identifier belongs to identifier information of the second communications server, so that the second communications server sends the information data to a second terminal corresponding to the target identifier.

According to another aspect, an embodiment of the present invention provides a terminal, being used as a first terminal, the first terminal being a terminal served by a first communications server, and the terminal including:

an information acquiring unit, configured to acquire identifier information that belongs to a second communications server;

a display unit, configured to display the identifier information acquired by the information acquiring unit;

a data receiving unit, configured to receive information data, a target identifier corresponding to the information data being the identifier information of the second communications server; and a data sending unit, configured to send the information data to the first communications server, so that the first communications server forwards the information data to the second communications server.

According to another aspect, an embodiment of the present invention provides an information transmission control system, including: a first communications server, a second communications server, a first terminal, and a second terminal, where the first terminal and the first communications server are connected in a communicable manner, the second terminal and the second communications server are connected in a communicable manner, and the first communications server and the second communications server are connected in a communicable manner; and the first communications server is any one of communications servers provided in embodiments of the present invention, and the first terminal is any one of terminals provided in embodiments of the present invention.

In the embodiments of the present invention, a first communications server and a second communications server correspond to two communications platforms; and the first communications server determines a target of information data from a local platform, and then performs cross-platform forwarding, thereby implementing cross-platform instant messaging.

BRIEF DESCRIPTION OF THE DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In order to make the technical solutions and advantages of the present disclosure more comprehensible, the present disclosure is described below in further detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present disclosure.

Figure 1:
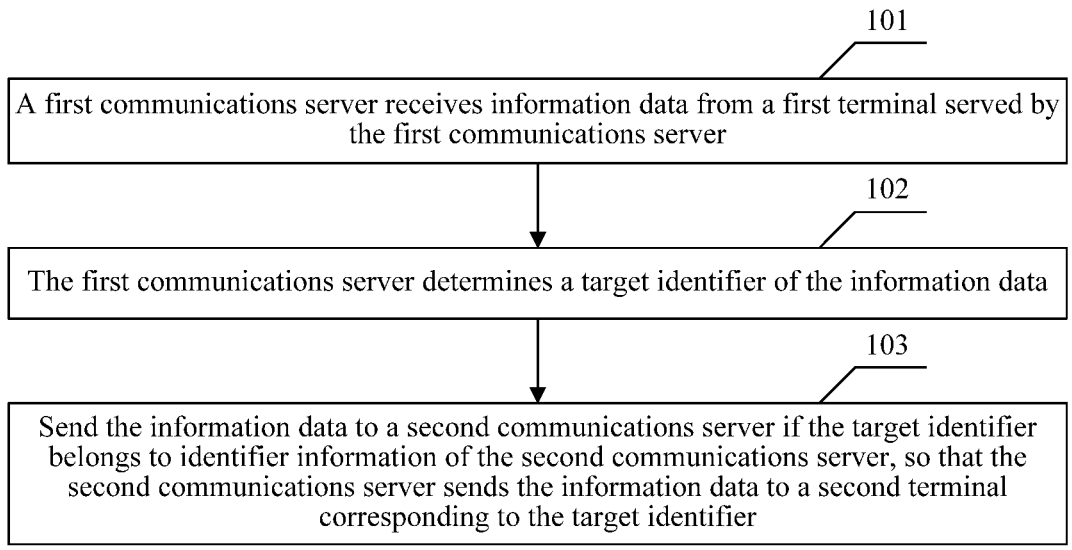
FIG. 1 is a schematic flowchart of a method according to an embodiment of the present invention.

An embodiment of the present invention provides an information transmission control method, as shown in FIG. 1, including:

101: A first communications server receives information data from a first terminal served by the first communications server.

In this embodiment of the present invention, both "first" and "second" that are used are merely for the purpose of distinguishing different entity devices represented by two same names, and shall not be understood as limitations with other technical meanings. In this embodiment of the present invention, the first communications server and the first terminal are a source side for sending information, and a second communications server and a second terminal are a destination side for sending information. The source side and the destination side for sending information are relative concepts, and an information sending direction in the field of instant messaging technologies is reversible; therefore, limitations on the communications servers and the terminals shall not be regarded as limitations with other meanings.

The first communications server provides an instant messaging platform; and the first terminal is a terminal that uses the instant messaging platform provided by the first communications server, and the first terminal is an entity device, and may usually be a terminal in which an application (or a client) using the instant messaging platform provided by the first communications server is installed. For example, in QQ instant messaging, a terminal with a QQ client (or a website application) installed therein and a chat server are used; or in a client game, a terminal with a game client installed therein and a game server are used.

102: The first communications server determines a target identifier of the information data.

In this embodiment of the present invention, the target identifier is information for determining a target terminal to which the information data is sent, and the information may have many representation forms such as a QQ account and a game account, which is not described in detail in this embodiment of the present invention. For different platforms, a platform usually does not store identifier information of another platform; therefore, identifier information acquisition may be involved, which is specifically as follows: before the determining, by the first communications server, a target identifier of the information data, the method further includes: acquiring, by the first communications server from the second communications server, identifier information that belongs to the second communications server and is related to the first terminal.

The identifier information is information for determining a target terminal to which the information data is sent, and a user may select, according to the information, a destination for sending; and in this case, a terminal may also need to acquire the information. For a terminal, the terminal may acquire corresponding identifier information from the second communications server by itself, which may be preferably implemented in this embodiment of the present invention by using the following solution: The method further includes: sending, by the first communications server, the acquired identifier information to the first terminal served by the first communications server.

Identifier information of different operators is usually not shared; therefore, to prevent identifier information from being maliciously acquired, limit an identifier information acquiring area, and ensure security of identifier information of a user, it is necessary to perform an authentication operation. There are many authentication algorithms such as an algorithm related to identity authentication and an algorithm related to legality authentication that can provide reference for a specific authentication solution, which is not described in detail in this embodiment of the present invention. An authentication solution in the present disclosure is specifically as follows: before the identifier information is acquired, the method further includes: performing, by the first communications server with the second communications server, permission authentication, where after permission authentication succeeds, the first communications server acquires, from the second communications server, the identifier information that belongs to the second communications server and is related to the first terminal.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

103: Send the information data to a second communications server if the target identifier belongs to identifier information of the second communications server, so that the second communications server sends the information data to a second terminal corresponding to the target identifier.

In this embodiment of the present invention, the first communications server and the second communications server correspond to two communications platforms; and the first communications server determines a target of information data from a local platform, and then performs cross-platform forwarding, thereby implementing cross-platform instant messaging.

The first communications server may also implement instant messaging within the local platform, and a specific solution is as follows: The method further includes: sending, by the first communications server, the information data to a terminal corresponding to the target identifier if the target identifier belongs to identifier information of the first communications server.

Figure 2:
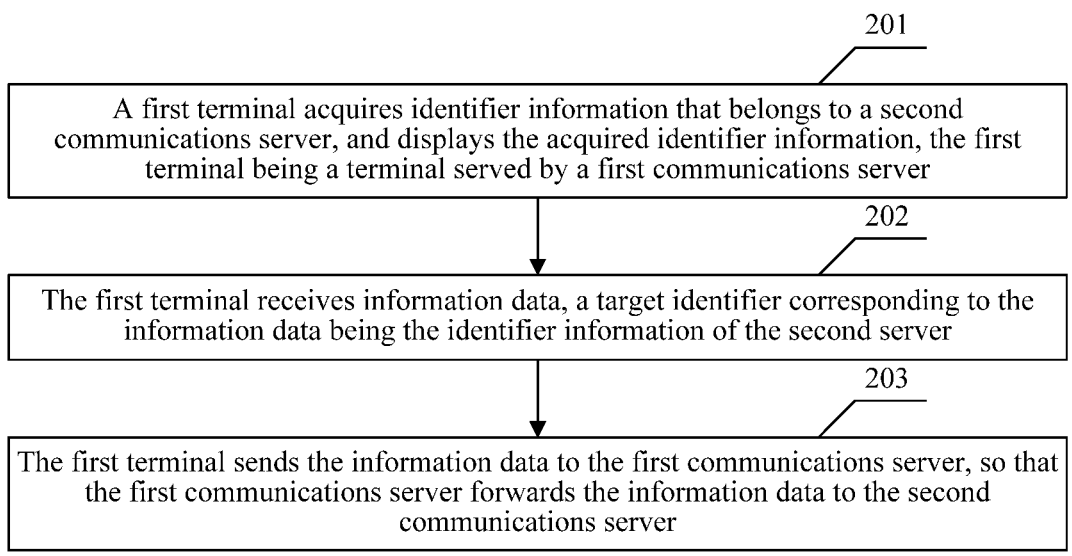
FIG. 2 is a schematic flowchart of a method according to an embodiment of the present invention.

An embodiment of the present invention further provides another information transmission control method, as shown in FIG. 2, including:

201: A first terminal acquires identifier information that belongs to a second communications server, and displays the acquired identifier information, the first terminal being a terminal served by a first communications server.

A manner for acquiring the identifier information is optional for the first terminal, for example, when clients of two platforms are installed in the first terminal at the same time, identifier information of the platforms that is saved in the clients may be exchanged, which may be implemented in this embodiment of the present invention by using the following solution: The acquiring, by a first terminal, identifier information that belongs to a second communications server includes: acquiring, through the first communications server from the second communications server, the identifier information that belongs to the second communications server.

The first terminal may also implement instant messaging within the local platform, and a specific solution is as follows: The method further includes: acquiring identifier information that belongs to the first communications server, and displaying the acquired identifier information.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

202: The first terminal receives information data, a target identifier corresponding to the information data being the identifier information of the second communications server.

For the first terminal, a user enters various types of information data on the first terminal, and may send the information data to anyone; therefore, the information data does not necessarily correspond to the identifier information of the second communications server. On a terminal side, this embodiment of the present invention mainly focuses on cross-platform information communication, and intra-platform instant communication is not a focus of this embodiment of the present invention; therefore, a case in which the target identifier corresponding to the information data is the identifier information of the first communications server is not described in the foregoing step. It is not always the case that the target identifier corresponding to the information data is the identifier information of the second communications server.

203: The first terminal sends the information data to the first communications server, so that the first communications server forwards the information data to the second communications server.

In this embodiment of the present invention, a first terminal acquires identifier information of a second communications server, and displays the identifier information of the second communications server, so that a user can know a user to which information data is to be sent across a platform; and after receiving the information data that is to be sent across the platform, the first terminal sends the information data to a first communications server, so that the first communications server forwards the information data to the second communications server, thereby implementing cross-platform instant messaging.

Figure 3:
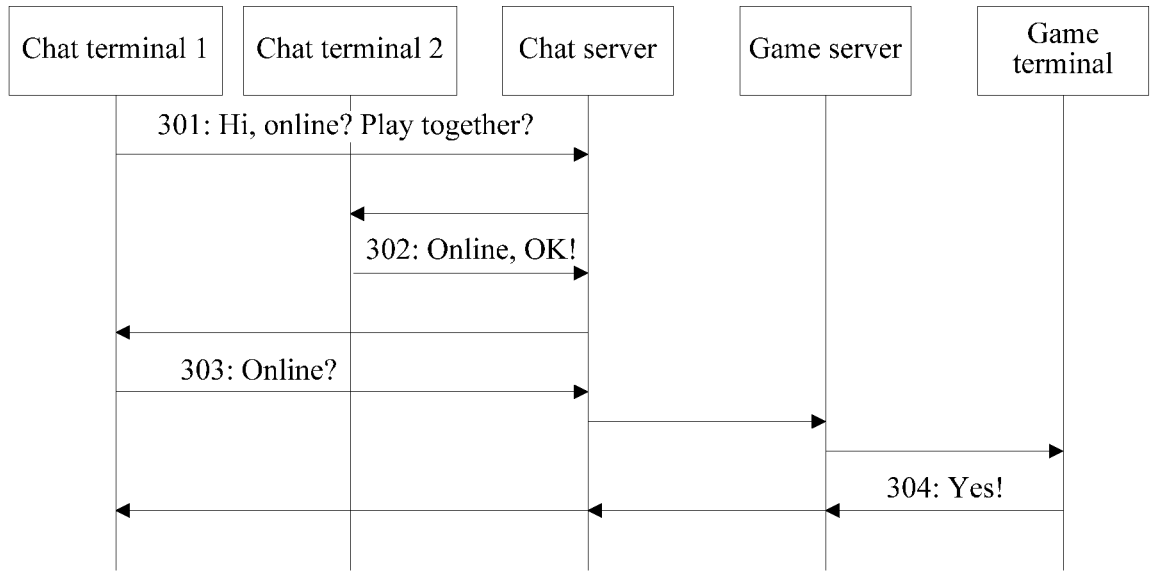
FIG. 3 is a schematic flowchart of a method according to an embodiment of the present invention.

Two platforms, namely, a client game and chat software, are used as an example for description in the following embodiment. As shown in FIG. 3, a game terminal, a game server, a chat server, and a chat terminal are included.

If cross-platform instant messaging cannot be implemented, the following problems exist A user can communicate normally only within a game, which greatly increases a communication cost of a virtual friendship within the game. A friendship of a player within the game can be exported to other instant messaging software only by manually importing the friendship, and the friendship and society members need to be manually updated when a change occurs, which greatly increases a maintenance cost of a player.

The following application scenario is used as an example in this embodiment of the present invention.

A player enters a chat interface after selecting a game role, and can perform operations for functions such as a chat with a friend, a chat with a society, and viewing of character information. The player can conveniently switch different game accounts in a game interface, thereby feeling as if staying within one game.

Figure 4:
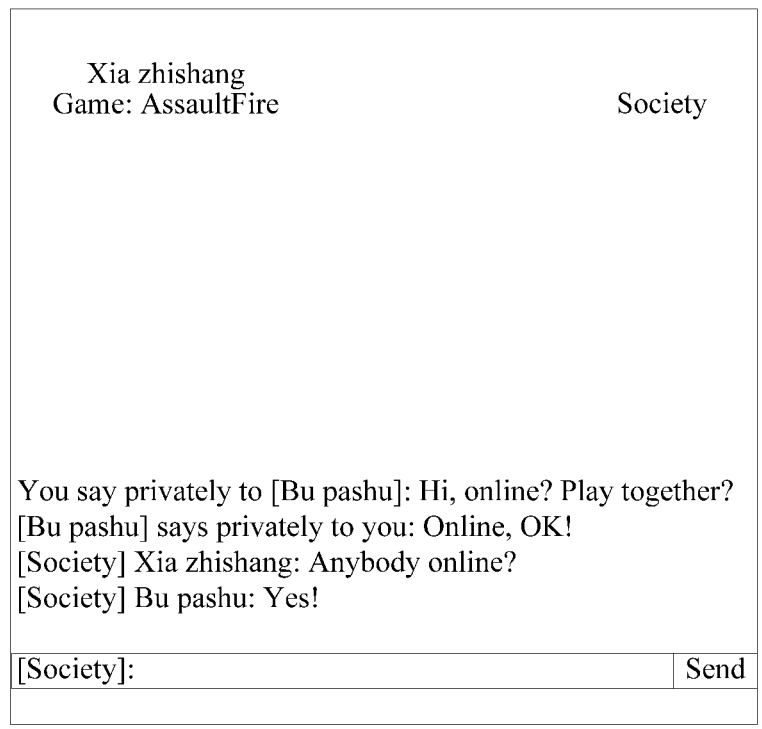
FIG. 4 is a schematic diagram of an instant messaging interface according to an embodiment of the present invention.
Figure 5:
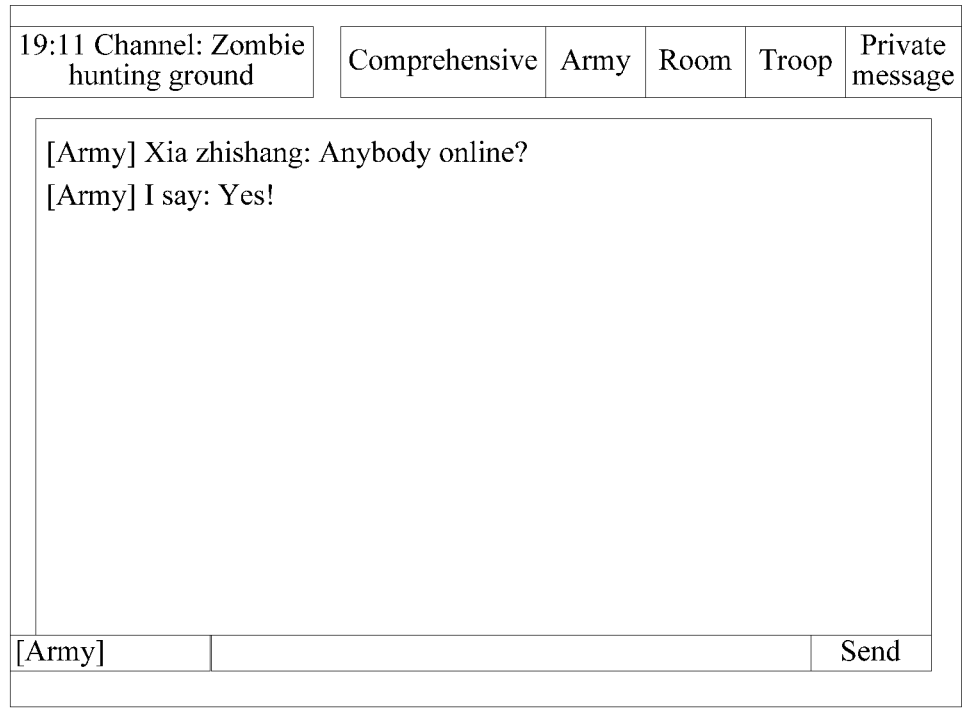
FIG. 5 is a schematic diagram of a game interface according to an embodiment of the present invention.

FIG. 4 is a diagram of an interface on the side of "Xia zhishang", and FIG. 5 is a diagram of an interface of a client game client on the side of "Bu pashu".

The role "Xia zhishang" in AssaultFire intends to send a message in a society, and in this case, may send a message in the society by using an application. If the role "Bu pashu" is currently within the game, "Bu pashu" can view, through a chat window, the message sent by the role "Xia zhishang" in the application; and if the role "Bu pashu" is currently not within the game, "Bu pashu" can view, through an application client, the message sent by the role "Xia zhishang" in the application.

If "Xia zhishang" intends to send a private message to "Bu pashu" in the same society (friends), "Xia zhishang" may select "Bu pashu" from a society (friends) list, where the society (friends) list is pulled from the game in real time, so as to send a message to "Bu pashu". In this way, the role "Bu pashu" can receive the message and chat with "Xia zhishang" within the game. If "Bu pashu" online within the game intends to send a society message or a private message to "Xia zhishang", "Xia zhishang" online in the application can also receive the message.

A specific message flow direction is shown in FIG. 3.

301: A chat terminal 1 of "Xia zhishang" sends a message "Hi, online? Play together?" The message is forwarded by a chat server to a chat terminal 2 of "Bu pashu".

302: A chat terminal 2 of "Bu pashu" sends a reply "Online, OK", where the reply is forwarded by the chat server to the chat terminal 1 of "Xia zhishang".

The foregoing procedure shows forwarding in intra-platform instant messaging, and subsequent 303 and 304 show forwarding in cross-platform instant messaging.

303: A chat terminal 1 of "Xia zhishang" sends a message "Online?", where the message arrives at a game terminal through a chat server and a game server, and is displayed on a game terminal of "Bu pashu".

304: "Bu pashu" enters a message "Yes!" after viewing the information, where the message arrives at the chat terminal 1 of "Xia zhishang" through the game server and the chat server, and is displayed to "Xia zhishang".

In the foregoing solution, a game player can chat with a player in a game in real time without logging into a game client or exporting a relationship chain within the game to another software, a friendship chain and a society relationship in the game are pulled in real time without worrying about a maintenance cost caused by a member change, and players on multiple terminals easily communicate with each other by communicating with a chat system in the game.

In this embodiment of the present invention, by staying online in multiple terminals, a problem that cross-platform instant messaging cannot be implemented can be solved. After a player logs in and plays a role, an application pulls and updates a latest friend and society list, and the player does not need to manually maintain an instant messaging list and a group list of the player. Moreover, content of real-time chats with a friend and a society in a game can also be acquired in real time at a software end, which helps the player to expand a friend circle of the player in the virtual world of the game.

Figure 6:
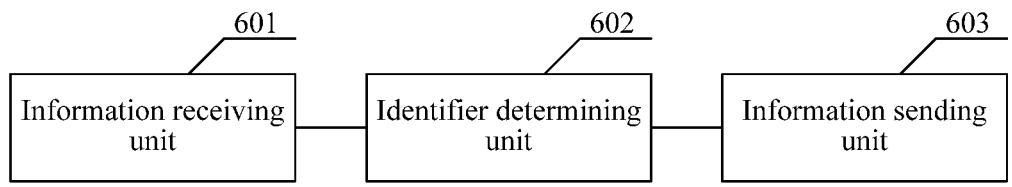
FIG. 6 is a schematic structural diagram of a communications server according to an embodiment of the present invention.

An embodiment of the present invention provides a communications server, as shown in FIG. 6, being used as a first communications server, and including:

an information receiving unit 601, configured to receive information data from a first terminal served by the first communications server;

an identifier determining unit 602, configured to determine a target identifier of the information data; and an information sending unit 603, configured to send the information data to a second communications server if the target identifier belongs to identifier information of the second communications server, so that the second communications server sends the information data to a second terminal corresponding to the target identifier.

In this embodiment of the present invention, both "first" and "second" that are used are merely for the purpose of distinguishing different entity devices represented by two same names, and shall not be understood as limitations with other technical meanings. In this embodiment of the present invention, the first communications server and the first terminal are a source side for sending information, and a second communications server and a second terminal are a destination side for sending information. The source side and the destination side for sending information are relative concepts, and an information sending direction in the field of instant messaging technologies is reversible; therefore, limitations on the communications servers and the terminals shall not be regarded as limitations with other meanings.

The first communications server provides an instant messaging platform; and the first terminal is a terminal that uses the instant messaging platform provided by the first communications server, and the first terminal is an entity device, and may usually be a terminal in which an application (or a client) using the instant messaging platform provided by the first communications server is installed. For example, in QQ instant messaging, a terminal with a QQ client (or a website application) installed therein and a chat server are used; or in a client game, a terminal with a game client installed therein and a game server are used.

In this embodiment of the present invention, the first communications server and the second communications server correspond to two communications platforms; and the first communications server determines a target of information data from a local platform, and then performs cross-platform forwarding, thereby implementing cross-platform instant messaging.

Figure 7:
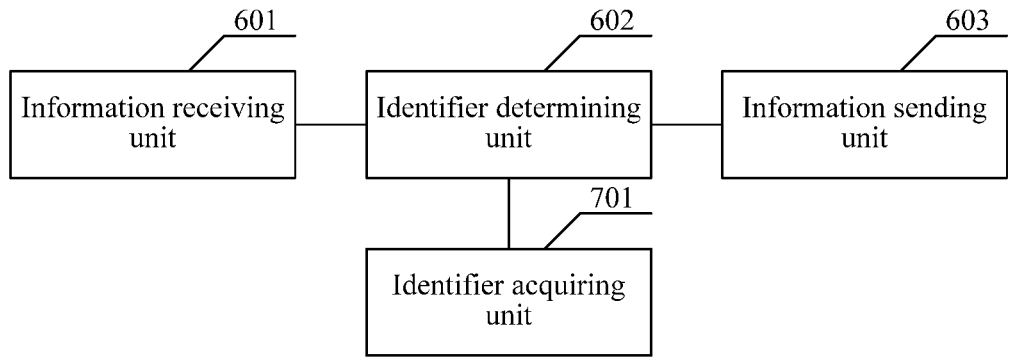
FIG. 7 is a schematic structural diagram of a communications server according to an embodiment of the present invention.

In this embodiment of the present invention, the target identifier is information for determining a target terminal to which the information data is sent, and the information may have many representation forms such as a QQ account and a game account, which is not described in detail in this embodiment of the present invention. For different platforms, a platform usually does not store identifier information of another platform; therefore, identifier information acquisition may be involved, which is specifically as follows: As shown in FIG. 7, the communications server further includes:

an identifier acquiring unit 701, configured to acquire, from the second communications server before the identifier determining unit 602 determines the target identifier of the information data, the identifier information that belongs to the second communications server and is related to the first terminal.

The identifier information is information for determining a target terminal to which the information data is sent, and a user may select, according to the information, a destination for sending; and in this case, a terminal may also need to acquire the information. For a terminal, the terminal may acquire corresponding identifier information from the second communications server by itself, which may be preferably implemented in this embodiment of the present invention by using the following solution: The information sending unit 603 is further configured to send the acquired identifier information to the first terminal served by the first communications server.

The first communications server may also implement instant messaging within the local platform, and a specific solution is as follows: The information sending unit 603 is further configured to send the information data to a terminal corresponding to the target identifier if the target identifier belongs to identifier information of the first communications server.

Figure 8:
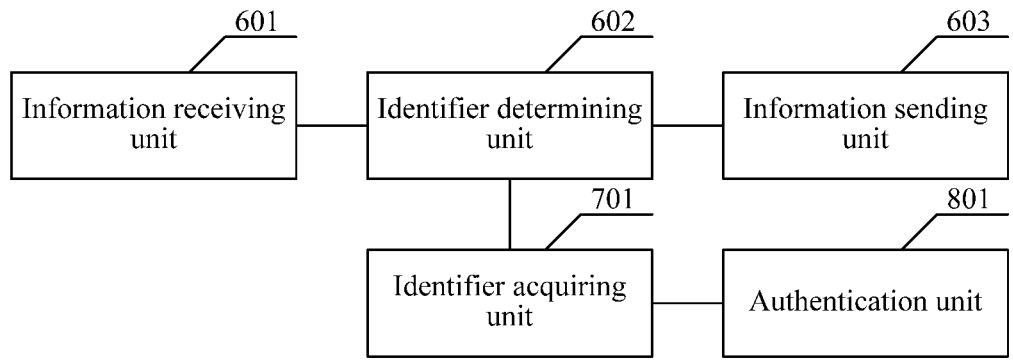
FIG. 8 is a schematic structural diagram of a communications server according to an embodiment of the present invention.

Identifier information of different operators is usually not shared; therefore, to prevent identifier information from being maliciously acquired, limit an identifier information acquiring area, and ensure security of identifier information of a user, it is necessary to perform an authentication operation. There are many authentication algorithms such as an algorithm related to identity authentication and an algorithm related to legality authentication that can provide reference for a specific authentication solution, which is not described in detail in this embodiment of the present invention. An authentication solution in the present disclosure is specifically as follows: As shown in FIG. 8, the communications server further includes:

an authentication unit 801, configured to perform permission authentication with the second communications server before the identifier acquiring unit 701 acquires the identifier information; and the identifier acquiring unit 701 is configured to: after permission authentication performed by the authentication unit 801 succeeds, acquire, from the second communications server, the identifier information that belongs to the second communications server and is related to the first terminal.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

Figure 9:
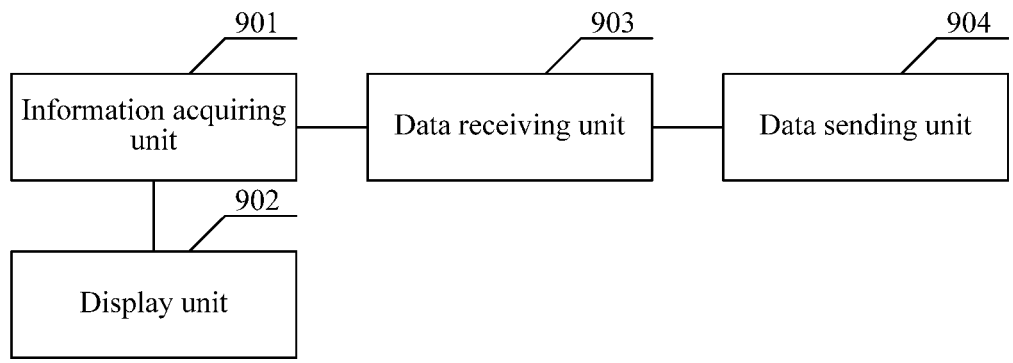
FIG. 9 is a schematic structural diagram of a terminal according to an embodiment of the present invention.

An embodiment of the present invention further provides a terminal, as shown in FIG. 9, being used as a first terminal, the first terminal being a terminal served by a first communications server, and the terminal including:

an information acquiring unit 901, configured to acquire identifier information that belongs to a second communications server;

a display unit 902, configured to display the identifier information acquired by the information acquiring unit 901;

a data receiving unit 903, configured to receive information data, a target identifier corresponding to the information data being the identifier information of the second communications server; and a data sending unit 904, configured to send the information data to the first communications server, so that the first communications server forwards the information data to the second communications server.

For the first terminal, a user enters various types of information data on the first terminal, and may send the information data to anyone; therefore, the information data does not necessarily correspond to the identifier information of the second communications server. On a terminal side, this embodiment of the present invention mainly focuses on cross-platform information communication, and intra-platform instant communication is not a focus of this embodiment of the present invention; therefore, a case in which the target identifier corresponding to the information data is the identifier information of the first communications server is not described in the foregoing step. It is not always the case that the target identifier corresponding to the information data is the identifier information of the second communications server.

In this embodiment of the present invention, a first terminal acquires identifier information of a second communications server, and displays the identifier information of the second communications server, so that a user can know a user to which information data is to be sent across a platform; and after receiving the information data that is to be sent across the platform, the first terminal sends the information data to a first communications server, so that the first communications server forwards the information data to the second communications server, thereby implementing cross-platform instant messaging.

A manner for acquiring the identifier information is optional for the first terminal, for example, when clients of two platforms are installed in the first terminal at the same time, identifier information of the platforms that is saved in the clients may be exchanged, which may be implemented in this embodiment of the present invention by using the following solution: The acquiring, by a first terminal, identifier information that belongs to a second communications server includes that the information acquiring unit 901 is configured to acquire, through the first communications server from the second communications server, the identifier information that belongs to the second communications server.

The first terminal may also implement instant messaging within the local platform, and a specific solution is as follows: The information acquiring unit 901 is further configured to acquire identifier information that belongs to the first communications server.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

Figure 10:
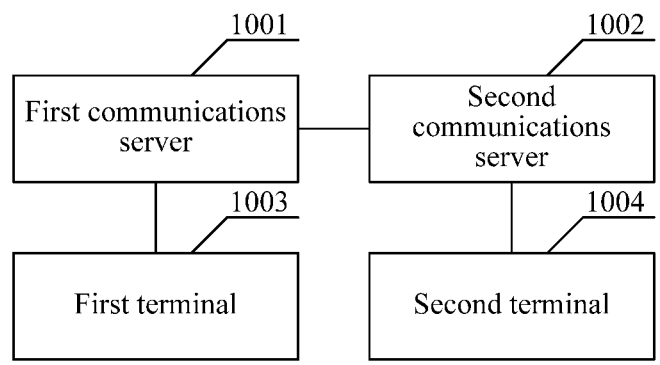
FIG. 10 is a schematic structural diagram of a system according to an embodiment of the present invention.

An embodiment of the present invention further provides an information transmission control system, as shown in FIG. 10, including: a first communications server 1001, a second communications server 1002, a first terminal 1003, and a second terminal 1004.

The first terminal 1003 and the first communications server 1001 are connected in a communicable manner, the second terminal 1004 and the second communications server 1002 are connected in a communicable manner, and the first communications server 1001 and the second communications server 1002 are connected in a communicable manner.

The first communications server 1001 is any one of communications servers provided in embodiments of the present invention, and the first terminal 1003 is any one of terminals provided in embodiments of the present invention.

In this embodiment of the present invention, the first terminal acquires identifier information of the second communications server, and displays the identifier information, so that a user can know a user to which information data is to be sent across a platform; and after receiving the information data that is to be sent across the platform, the first terminal sends the information data to the first communications server, so that the first communications server forwards the information data to the second communications server. The first communications server and the second communications server correspond to two communications platforms; and the first communications server determines a target of the information data from a local platform, and then performs cross-platform forwarding, thereby implementing cross-platform instant messaging.

Figure 11:
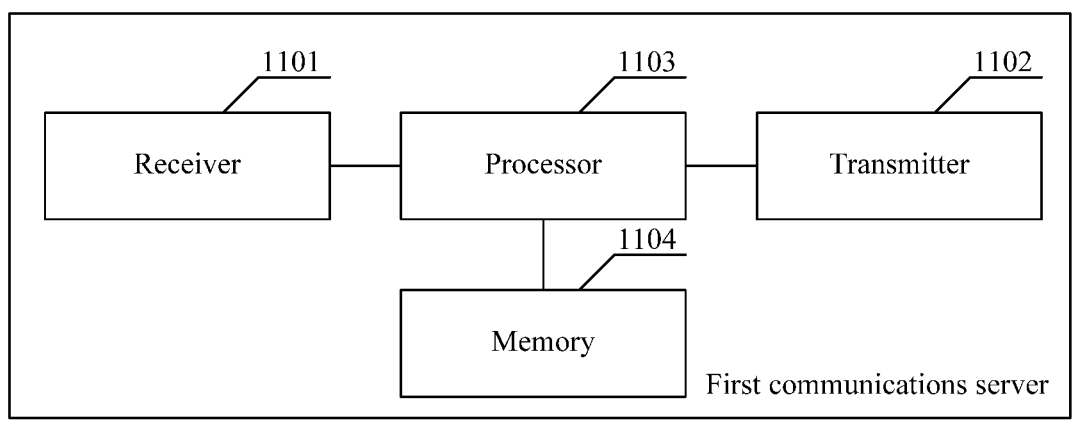
FIG. 11 is a schematic structural diagram of a communications server according to an embodiment of the present invention.

An embodiment of the present invention further provides another communications server, being used as a first communications server, and as shown in FIG. 11, including: a receiver 1101, a transmitter 1102, a processor 1103, and a memory 1104.

The processor 1103 is configured to control execution of steps of receiving information data from a first terminal served by the first communications server; determining a target identifier of the information data; and sending the information data to a second communications server if the target identifier belongs to identifier information of the second communications server, so that the second communications server sends the information data to a second terminal corresponding to the target identifier.

In this embodiment of the present invention, the first communications server and the second communications server correspond to two communications platforms; and the first communications server determines a target of information data from a local platform, and then performs cross-platform forwarding, thereby implementing cross-platform instant messaging.

In this embodiment of the present invention, both "first" and "second" that are used are merely for the purpose of distinguishing different entity devices represented by two same names, and shall not be understood as limitations with other technical meanings. In this embodiment of the present invention, the first communications server and the first terminal are a source side for sending information, and a second communications server and a second terminal are a destination side for sending information. The source side and the destination side for sending information are relative concepts, and an information sending direction in the field of instant messaging technologies is reversible; therefore, limitations on the communications servers and the terminals shall not be regarded as limitations with other meanings.

The first communications server provides an instant messaging platform; and the first terminal is a terminal that uses the instant messaging platform provided by the first communications server, and the first terminal is an entity device, and may usually be a terminal in which an application (or a client) using the instant messaging platform provided by the first communications server is installed. For example, in QQ instant messaging, a terminal with a QQ client (or a website application) installed therein and a chat server are used; or in a client game, a terminal with a game client installed therein and a game server are used.

In this embodiment of the present invention, the target identifier is information for determining a target terminal to which the information data is sent, and the information may have many representation forms such as a QQ account and a game account, which is not described in detail in this embodiment of the present invention. For different platforms, a platform usually does not store identifier information of another platform; therefore, identifier information acquisition may be involved, which is specifically as follows: The processor 1103 is further configured to control execution of a step of acquiring, from the second communications server before the target identifier of the information data is determined, the identifier information that belongs to the second communications server and is related to the first terminal.

The identifier information is information for determining a target terminal to which the information data is sent, and a user may select, according to the information, a destination for sending; and in this case, a terminal may also need to acquire the information. For a terminal, the terminal may acquire corresponding identifier information from the second communications server by itself, which may be preferably implemented in this embodiment of the present invention by using the following solution: The processor 1103 is further configured to control execution of a step of sending the acquired identifier information to the first terminal served by the first communications server.

Identifier information of different operators is usually not shared; therefore, to prevent identifier information from being maliciously acquired, limit an identifier information acquiring area, and ensure security of identifier information of a user, it is necessary to perform an authentication operation. There are many authentication algorithms such as an algorithm related to identity authentication and an algorithm related to legality authentication that can provide reference for a specific authentication solution, which is not described in detail in this embodiment of the present invention. An authentication solution in the present disclosure is specifically as follows: The processor 1103 is further configured to control execution of a step of performing permission authentication with the second communications server before the identifier information is acquired, where after permission authentication succeeds, the identifier information that belongs to the second communications server and is related to the first terminal is acquired from the second communications server.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

The first communications server may also implement instant messaging within the local platform, and a specific solution is as follows: The processor 1103 is further configured to control execution of a step of sending the information data to a terminal corresponding to the target identifier if the target identifier belongs to identifier information of the first communications server.

Figure 12:
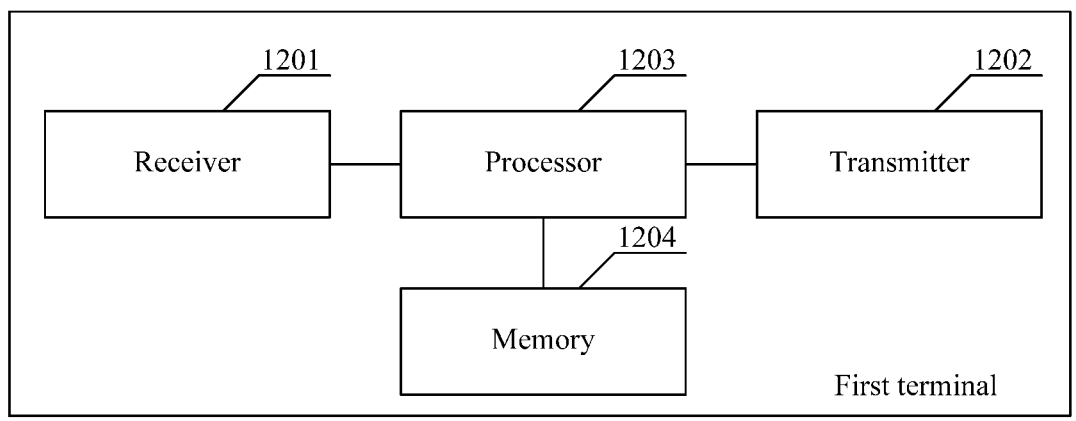
FIG. 12 is a schematic structural diagram of a terminal according to an embodiment of the present invention.

An embodiment of the present invention further provides another terminal, being used as a first terminal, and as shown in FIG. 12, including: a receiver 1201, a transmitter 1202, a processor 1203, and a memory 1204.

The processor 1203 is configured to control execution of steps of acquiring identifier information that belongs to a second communications server, and displaying the acquired identifier information, where the first terminal is a terminal served by a first communications server; receiving information data, a target identifier corresponding to the information data being the identifier information of the second communications server; and sending the information data to the first communications server, so that the first communications server forwards the information data to the second communications server.

In this embodiment of the present invention, a first terminal acquires identifier information of a second communications server, and displays the identifier information of the second communications server, so that a user can know a user to which information data is to be sent across a platform; and after receiving the information data that is to be sent across the platform, the first terminal sends the information data to a first communications server, so that the first communications server forwards the information data to the second communications server, thereby implementing cross-platform instant messaging.

In this embodiment of the present invention, for the first terminal, a user enters various types of information data on the first terminal, and may send the information data to anyone; therefore, the information data does not necessarily correspond to the identifier information of the second communications server. On a terminal side, this embodiment of the present invention mainly focuses on cross-platform information communication, and intra-platform instant communication is not a focus of this embodiment of the present invention; therefore, a case in which the target identifier corresponding to the information data is the identifier information of the first communications server is not described in the foregoing step. It is not always the case that the target identifier corresponding to the information data is the identifier information of the second communications server.

A manner for acquiring the identifier information is optional for the first terminal, for example, when clients of two platforms are installed in the first terminal at the same time, identifier information of the platforms that is saved in the clients may be exchanged, which may be implemented in this embodiment of the present invention by using the following solution: The processor 1203 is configured to control execution of a step of acquiring, through the first communications server from the second communications server, the identifier information that belongs to the second communications server.

The first terminal may also implement instant messaging within the local platform, and a specific solution is as follows: The processor 1203 is further configured to control execution of a step of acquiring identifier information that belongs to the first communications server, and displaying the acquired identifier information.

A message may be sent in a one-to-one manner (for example, in a private chat, a user sends a message to another user), or in a one-to-multiple manner (for example, in a group chat, a user sends a message to a group, and all users in the group can view the message); therefore, based on different application scenarios, the identifier information may also be different, which is specifically as follows: The identifier information includes a user identifier and/or a group identifier.

It is worth noting that in the foregoing communications server and terminal embodiments, the units included are merely classified according to functional logic, but are not limited to the foregoing classification provided that the corresponding functions can be implemented; in addition, the specific names of the various functional units are merely intended to conveniently distinguish between the functional units but not to limit the protection scope of the present disclosure.

In addition, a person of ordinary skill in the art may understand that all or a part of the steps in the foregoing method embodiments may be implemented by a program instructing relevant hardware. A corresponding program may be stored in a computer readable storage medium. The above-mentioned storage medium may include: a read-only memory, a magnetic disk, or an optical disc.

The foregoing descriptions are merely exemplary specific embodiments of the present invention, but are not intended to limit the protection scope of the present disclosure. Any variation or replacement readily figured out by a person skilled in the art within the technical scope disclosed in the embodiments of the present invention shall fall within the protection scope of the present disclosure. Therefore, the protection scope of the present disclosure shall be subject to the protection scope of the claims.

What is claimed is:

1. A cross-platform instant messaging method applied to a first communications server to be in communication with a second communications server, the method comprising:
   receiving, by the first communications server, information data from a first terminal served by the first communications server, wherein the information data includes a target identifier and an instant messaging chat message, wherein the target identifier identifies a second terminal to receive the information data, and wherein the instant messaging chat message is sent from a first instant messaging platform of the first terminal, running independently of a first game client of the first terminal; and
   sending, by the first communications server, the information data to the second communications server, wherein the second communications server in turn sends the information data to the second terminal identified by the target identifier, wherein the instant messaging chat message of the information data is received at the second terminal via a second instant messaging platform running on a second game client of the second terminal, and wherein the first instant messaging platform is served by a chat server of the first communications server and the second instant messaging platform is served by a game server of the second communications server.

2. The cross-platform instant messaging method of claim 1, further comprising:
   acquiring, by the first communications server, from the second communications server, identifier information corresponding to the second communications server; and
   determining, by the first communications server, the target identifier of the information data corresponds to the identifier information of the second communication server.

3. The cross-platform instant messaging method of claim 1, further comprising:
   performing, by the first communications server, in collaboration with the second communication server, permission authentication;
   in response to determining the permission authentication succeeds, acquiring, by the first communications server, from the second communications server, the identifier information corresponding to the second communications server; and
   determining, by the first communications server, the target identifier of the information data corresponds to the identifier information of the second communication server.

4. The cross-platform instant messaging method of claim 1, wherein the instant messaging chat message arrives at the second game client served by the game server from the first instant messaging platform served by the chat server.

5. The cross-platform instant messaging method of claim 1, further comprising:
   receiving, by the first communications server, an instant messaging reply chat message from the second instant messaging platform served by the game server of the second communications server.

6. The cross-platform instant messaging method of claim 1, wherein the first gaming client is closed and inactive while the instant messaging chat message is sent from the first terminal to the first communications server.

7. The cross-platform instant messaging method of claim 1, wherein the instant messaging chat message, upon receipt at the second terminal, is displayed on top of a gaming session run by the second game client.

8. A cross-platform instant messaging method applied to a second communications server to be in communication with a first communications server, the method comprising:
   receiving, by the second communications server, information data from the first communications server, wherein the information data is received by the first communications server from a first terminal served by the first communications server, wherein the information data includes a target identifier and an instant messaging chat message, wherein the target identifier identifies a second terminal to receive the information data, and wherein the instant messaging chat message is sent from a first instant messaging platform of the first terminal, running independently of a first game client of the first terminal; and sending, by the second communications server, the information data to the second terminal identified by the target identifier, wherein the instant messaging chat message of the information data is received at the second terminal via a second instant messaging platform running on a second game client of the second terminal, and wherein the first instant messaging platform is served by a chat server of the first communications server and the second instant messaging platform is served by a game server of the second communications server.

9. The cross-platform instant messaging method of claim 8, further comprising:

sending, by the second communication server, to the first communications server, identifier information corresponding to the second communications server, wherein the first communication server determines the target identifier of the information data corresponds to the identifier information of the second communication server.

10. The cross-platform instant messaging method of claim 8, further comprising:

facilitating, by the second communications server, performance by the first communication server of a permission authentication; and in response to determining the permission authentication succeeds, sending, by the second communications server, to the first communications server, identifier information corresponding to the second communications server, wherein the first communication server determines the target identifier of the information data corresponds to the identifier information of the second communication server.

11. The cross-platform instant messaging method of claim 8, wherein the instant messaging chat message arrives at the second game client served by the game server from the first instant messaging platform served by the chat server.

12. The cross-platform instant messaging method of claim 8, further comprising:

sending, by the second communications server, an instant messaging reply chat message to the first communications server, wherein the instant messaging reply chat message is sent from the second instant messaging platform served by the game server of the second communications server.

13. The cross-platform instant messaging method of claim 1, wherein the first gaming client is closed and inactive while the instant messaging chat message is sent from the first terminal to the first communications server.

14. The cross-platform instant messaging method of claim 8, wherein the instant messaging chat message, upon receipt at the second terminal, is displayed on top of a gaming session run by the second game client.

15. A cross-platform instant messaging method, comprising:

generating, by the first terminal, information data, wherein the information data includes a target identifier and an instant messaging chat message, and wherein the target identifier identifies a second terminal to receive the information data; and sending, by the first terminal, the information data to a first communications server serving the first terminal, wherein the information data is sent from a first instant messaging platform of the first terminal, running independently of a first game client of the first terminal, wherein the first communications server in turn sends the information data to the second communications server, wherein the second communications server further in turn sends the information data to the second terminal identified by the target identifier, wherein the instant messaging chat message of the information data is received at the second terminal via a second instant messaging platform running on a second game client of the second terminal, and wherein the first instant messaging platform is served by a chat server of the first communications server and the second instant messaging platform is served by a game server of the second communications server.

16. The cross-platform instant messaging method of claim 15, acquiring, from the second communications server and via the first communications server, identifier information corresponding to the second communications server.

17. The cross-platform instant messaging method of claim 15, acquiring, from the first communications server, identifier information corresponding to the first communications server.

* * * * *